(12) United States Patent
Leanza et al.

(10) Patent No.: US 10,239,559 B2
(45) Date of Patent: Mar. 26, 2019

(54) VEHICLE FRAMES AND METHODS OF ASSEMBLING THE SAME

(71) Applicants: Anthony John Leanza, Powell, OH (US); Brian Christopher Bray, Dublin, OH (US)

(72) Inventors: Anthony John Leanza, Powell, OH (US); Brian Christopher Bray, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 141 days.

(21) Appl. No.: 15/069,191

(22) Filed: Mar. 14, 2016

(65) Prior Publication Data

US 2017/0259853 A1 Sep. 14, 2017

(51) Int. Cl.
| | | |
|---|---|---|
| *B62D 21/15* | (2006.01) | |
| *B60R 19/24* | (2006.01) | |
| *B62D 65/16* | (2006.01) | |
| *B62D 21/11* | (2006.01) | |
| *B62D 25/08* | (2006.01) | |

(52) U.S. Cl.
CPC ............ *B62D 21/155* (2013.01); *B60R 19/24* (2013.01); *B62D 21/11* (2013.01); *B62D 25/082* (2013.01); *B62D 65/16* (2013.01); *B60R 2019/242* (2013.01); *B60R 2019/247* (2013.01)

(58) Field of Classification Search
CPC ........ B62D 21/155; B62D 65/16; B60R 19/24
USPC .................... 296/187.09, 187.1, 204, 203.02
See application file for complete search history.

(56) References Cited

U.S. PATENT DOCUMENTS

| | | |
|---|---|---|
| 5,992,555 A | 11/1999 | Sakamoto et al. |
| 6,398,292 B2 | 6/2002 | Tsuruta et al. |
| 6,843,524 B2 | 1/2005 | Kitagawa |
| 6,866,115 B2 | 3/2005 | Miyasaka |
| 6,899,195 B2 | 5/2005 | Miyasaka |
| 6,991,284 B2 | 1/2006 | Kim |
| 7,213,873 B2 | 5/2007 | Murata et al. |
| 7,448,673 B2 | 11/2008 | Yasuhara |
| 7,594,559 B2 | 9/2009 | Kitoh et al. |
| 7,681,943 B2* | 3/2010 | Murata .................. B62D 21/11 296/187.09 |
| 7,810,878 B2 | 10/2010 | Nakamura et al. |
| 7,900,964 B2 | 3/2011 | Chretien et al. |
| 8,287,031 B2 | 10/2012 | Braunbeck et al. |
| 8,454,064 B2 | 6/2013 | Frank |

(Continued)

FOREIGN PATENT DOCUMENTS

| | | |
|---|---|---|
| DE | 19851495 A1 | 5/2000 |
| DE | 102013101085 A1 | 8/2014 |

(Continued)

OTHER PUBLICATIONS

German Search Report for related application No. 102017204066.1, dated Nov. 10, 2017, and unofficial translation, 17 pages.

(Continued)

*Primary Examiner* — Joseph D. Pape
(74) *Attorney, Agent, or Firm* — Armstrong Teasdale LLP

(57) ABSTRACT

A vehicle frame is provided. The vehicle frame includes a body frame, a subframe mounted to the body frame, and a bumper frame coupled to the body frame. The bumper frame includes a beam having a first end and a second end. The vehicle frame also includes at least one brace coupling the beam to the subframe adjacent to at least one of the beam ends.

15 Claims, 4 Drawing Sheets

(56) References Cited

U.S. PATENT DOCUMENTS

| | | |
|---|---|---|
| 8,480,102 B2 | 7/2013 | Yamada et al. |
| 2004/0183338 A1 | 9/2004 | Makita et al. |
| 2008/0238150 A1 | 10/2008 | Nakamura et al. |
| 2012/0007373 A1 | 1/2012 | Boettcher et al. |
| 2015/0274209 A1 | 10/2015 | Basappa et al. |
| 2016/0039464 A1 | 2/2016 | Hirano et al. |
| 2016/0176442 A1* | 6/2016 | Miyagano ............ B62D 21/152 296/193.09 |

FOREIGN PATENT DOCUMENTS

| | | |
|---|---|---|
| EP | 2894083 A1 | 7/2015 |
| JP | 2005170269 A | 6/2005 |
| JP | 2015131585 A | 7/2015 |

OTHER PUBLICATIONS

JP Office Action for related application 2017-047068 dated Mar. 27, 2018; 4 pages.

* cited by examiner

US 10,239,559 B2

VEHICLE FRAMES AND METHODS OF ASSEMBLING THE SAME

BACKGROUND

The present disclosure relates generally to vehicle frames and, more particularly, to a collision load management system for use with a vehicle frame.

Many known vehicle frames include a body frame, a subframe mounted to the body frame, and a bumper frame mounted to the body frame. However, other than the bumper frame and the subframe both being coupled to the body frame, the bumper frame and the subframe are not otherwise coupled together. Thus, in the event of a collision where a load, which may or may not be laterally offset from the body frame, is imparted to the bumper frame and/or the subframe, the bumper frame and the subframe cannot work in tandem to effectively manage the energy. It would be desirable, therefore, to provide a system that enables loading to be managed amongst both the subframe and the bumper frame in the event of a collision in which only one or both of the structures are directly engaged.

BRIEF SUMMARY

In one aspect, a vehicle frame is provided. The vehicle frame includes a body frame, a subframe mounted to the body frame, and a bumper frame coupled to the body frame. The bumper frame includes a beam having a first end and a second end. The vehicle frame also includes at least one brace coupling the beam to the subframe adjacent to at least one of the beam ends.

In another aspect, a method of assembling a vehicle frame is provided. The method includes mounting a subframe to a body frame and coupling a bumper frame to the body frame. The bumper frame includes a beam having a first end and a second end. The method also includes coupling the beam to the subframe adjacent to at least one of the beam ends via at least one brace.

In yet another aspect, a subframe for a vehicle is provided. The vehicle has a first front wheel and tire assembly and a second front wheel and tire assembly. The subframe has a widthwise dimension and includes a front beam and a first side beam joined with the front beam at a first joint. The first side beam defines a first space sized to receive at least a portion of the first front wheel and tire assembly. The first joint is sized to extend in front of the first front wheel and tire assembly in the widthwise dimension of the subframe. The subframe also includes a second side beam joined with the front beam at a second joint. The second side beam defines a second space sized to receive at least a portion of the second front wheel and tire assembly. The second joint is sized to extend in front of the second front wheel and tire assembly in the widthwise dimension of the subframe.

The features, functions, and advantages described herein may be achieved independently in various embodiments of the present disclosure or may be combined in yet other embodiments, further details of which may be seen with reference to the following description and drawings.

Although specific features of various embodiments may be shown in some drawings and not in others, this is for convenience only. Any feature of any drawing may be referenced and/or claimed in combination with any feature of any other drawing.

DETAILED DESCRIPTION

The present disclosure relates generally to vehicle frames and methods of assembling the same. The exemplary vehicle frame includes a body frame, a subframe mounted to the body frame, a bumper frame mounted to the body frame, and a brace that directly couples the bumper frame to the subframe. The vehicle frame therefore facilitates managing collision loads in a manner that enables loading to be managed amongst both the subframe and the bumper frame in the event of a collision in which only one of the structures is directly engaged. More specifically, the vehicle frame facilitates establishing a load path from the bumper frame directly to the subframe, or vice versa, such that the bumper frame and the subframe work in tandem to withstand collision loads. As such, in the exemplary embodiment, the direct coupling between the bumper frame and the subframe can enhance the energy management capability of the vehicle frame. This includes the subframe and bumper frame: 1) resisting deformation to withstand loading; 2) absorbing energy; and 3) transferring loading/energy to the body frame in the event of a collision. The collision may or may not directly engage the body frame. Thus, the strength of the vehicle frame is enhanced, which in turn facilitates enhancing the overall level of safety associated with the vehicle frame.

As used herein, an element or step recited in the singular and preceded with the word "a" or "an" should be understood as not excluding plural elements or steps unless such exclusion is explicitly recited. Moreover, references to "one embodiment" and/or the "exemplary embodiment" are not intended to be interpreted as excluding the existence of additional embodiments that also incorporate the recited features.

Figure 1:
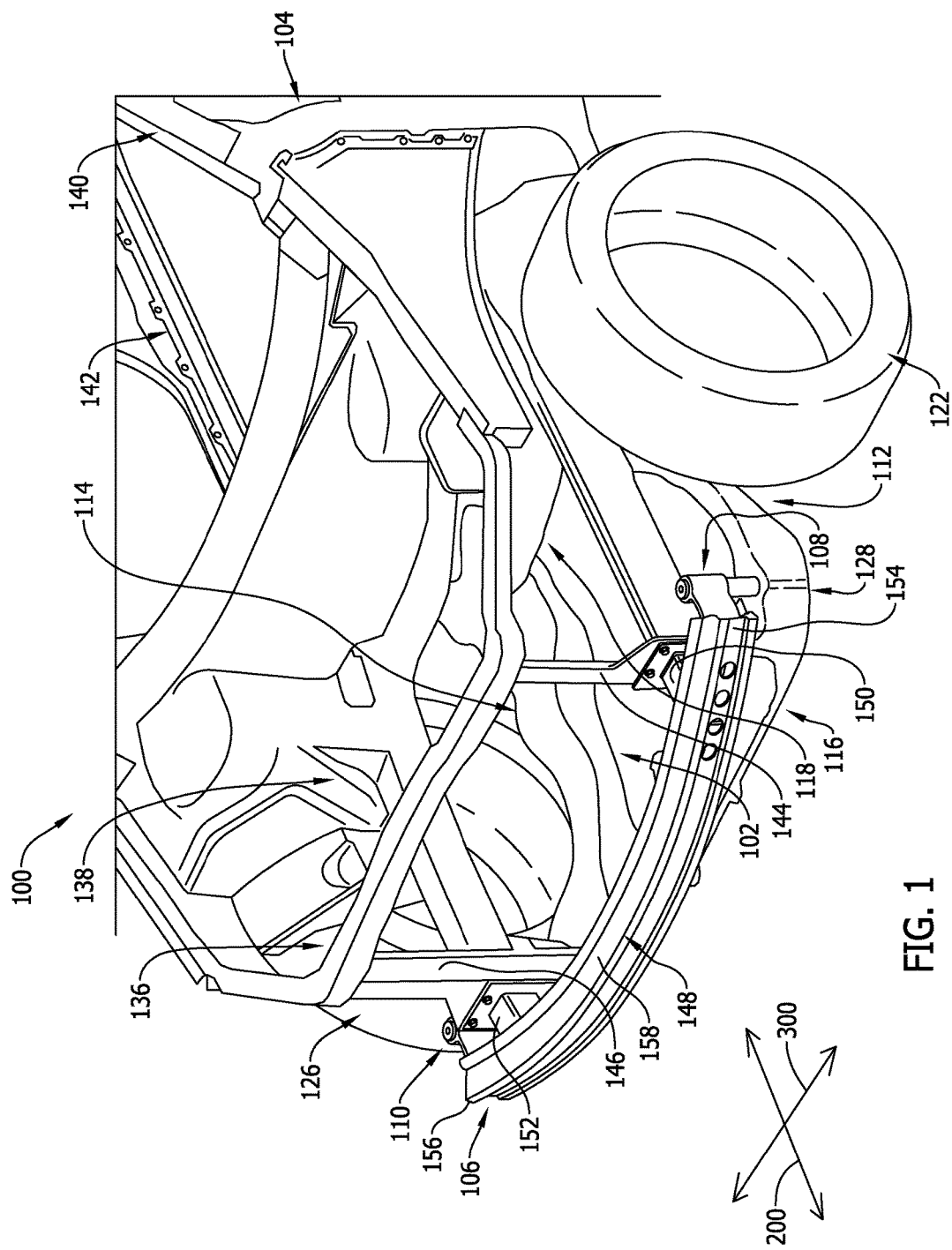
FIG. 1 is a top perspective view of an exemplary vehicle frame.
Figure 2:
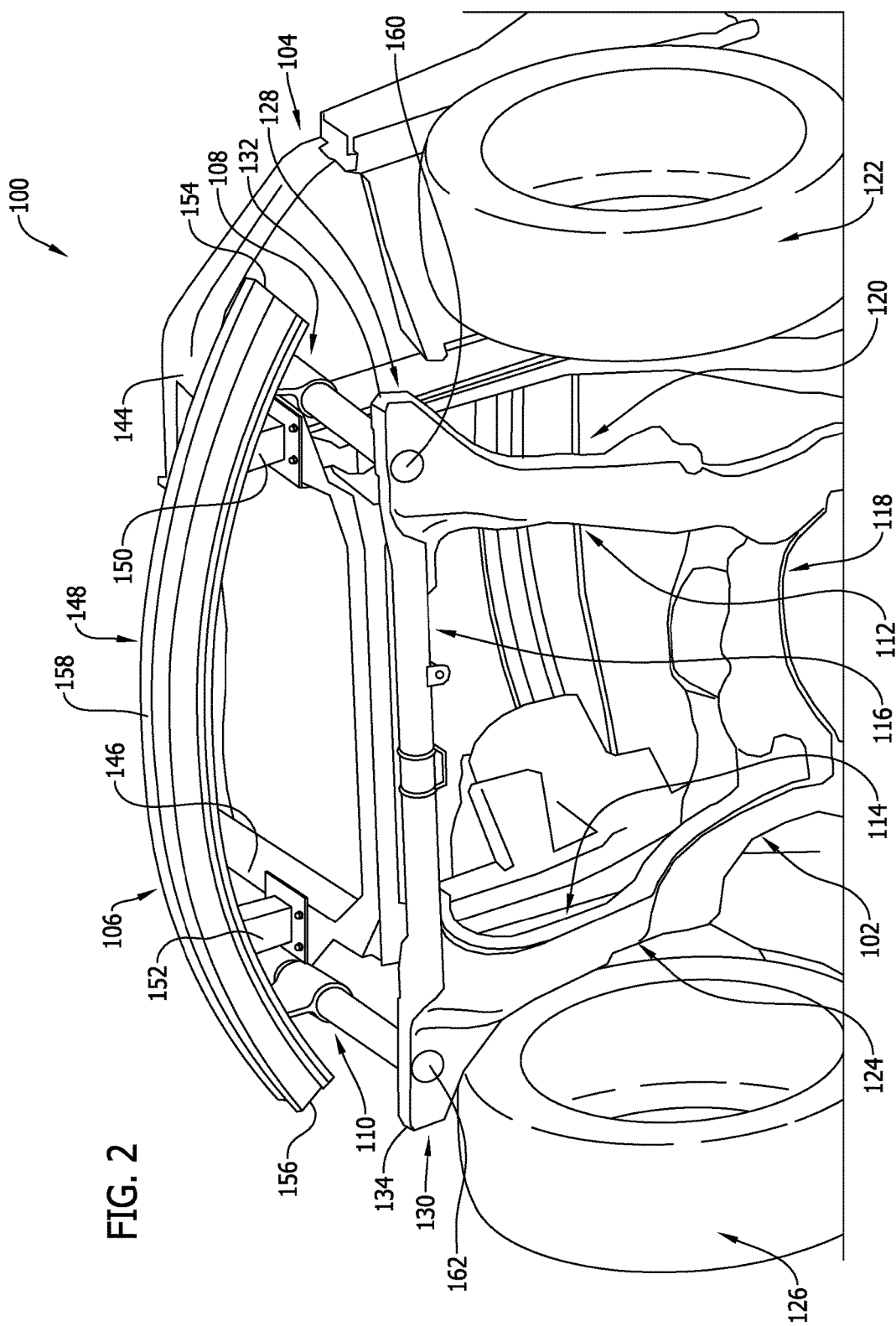
FIG. 2 is a bottom perspective view of the frame shown in FIG. 1.

FIGS. 1 and 2 are respective top and bottom perspective views of an exemplary vehicle frame 100. In the exemplary embodiment, frame 100 has a lengthwise dimension 200 and a widthwise dimension 300, and frame 100 includes a front subframe 102 (or engine cradle), a body frame 104 that subframe 102 mounts to, and a bumper frame 106 coupled to body frame 104. Notably, bumper frame 106 is also coupled to subframe 102 via at least one brace, namely a first brace 108 and a second brace 110 that facilitate managing collision loads imparted to bumper frame 106 and/or subframe 102, as set forth in more detail below. In other embodiments, frame 100 may include any suitable number of components coupled together in any suitable manner that facilitates enabling frame 100 to function as described herein.

In the exemplary embodiment, subframe 102 is a single-piece, unitary structure that includes a pair of side beams, namely a first side beam 112 and a second side beam 114 that is spaced a distance from first side beam 112 in widthwise dimension 300. Likewise, subframe 102 also includes a pair of end beams, namely a front beam 116 and a rear beam 118 that is spaced a distance from front beam 116 in lengthwise dimension 200. In the exemplary embodiment, first side beam 112 and second side beam 114 are each arcuately shaped, such that first side beam 112 defines a first space 120 (or first concavity) sized to receive at least a portion of a first front wheel and tire assembly 122 therein, and such that second side beam 114 defines a second space 124 (or second concavity) sized to receive at least a portion of a second front wheel and tire assembly 126 therein.

Moreover, in the exemplary embodiment, front beam 116 intersects first side beam 112 at a first joint 128, and front beam 116 intersects second side beam 114 at a second joint 130. First joint 128 extends outward of body frame 104 in widthwise dimension 300 to a first distal end 132, such that first joint 128 at least partially overlaps first front wheel and tire assembly 122 in widthwise dimension 300 as frame 100 is viewed from the front (i.e., first joint 128 is sized to be positioned in front of first front wheel and tire assembly 122 in widthwise dimension 300). Similarly, second joint 130 extends outward of body frame 104 in widthwise dimension 300 to a second distal end 134, such that second joint 130 at least partially overlaps second front wheel and tire assembly 126 in widthwise dimension 300 as frame 100 is viewed from the front (i.e., second joint 130 is sized to be positioned in front of second front wheel and tire assembly 126 in widthwise dimension 300). In other embodiments, subframe 102 may include any suitable number of beams arranged and joined together in any suitable manner that facilitates enabling frame 100 to function as described herein (e.g., joints 128 and/or 130 of subframe 102 may not overlap their associated front wheel and tire assemblies 122 and/or 126, respectively, in widthwise dimension 300).

In the exemplary embodiment, body frame 104 is a multi-piece structure to which subframe 102 is mounted. More specifically, body frame 104 includes an assemblage of front members 136 that are coupled (e.g., welded such as, for example, spot welded) together to define an engine compartment 138 of body frame 104, and an assemblage of intermediate members 140 that are coupled (e.g., welded such as, for example, spot welded) together to define a cabin 142 of body frame 104. Body frame 104 may optionally include an assemblage of rear members (not shown) that are coupled (e.g., welded such as, for example, spot welded) together to define a cargo-carrying compartment (not shown) of body frame 104 (e.g., a bed or trunk of body frame 104). Front members 136 include a first front member 144 that is coupled (e.g., bolted) to subframe 102, and a second front member 146 that is coupled (e.g., bolted) to subframe 102. In other embodiments, body frame 104 may include any suitable number of members that are coupled to subframe 102, and/or are coupled to one another, in any suitable manner that facilitates enabling frame 100 to function as described herein.

In the exemplary embodiment, bumper frame 106 includes a beam 148 and at least one bracket (e.g., a first bracket 150 and a second bracket 152) for coupling beam 148 to body frame 104. In the exemplary embodiment, beam 148 is a single-piece, unitary structure having a first end 154, a second end 156, and a body 158 extending from first end 154 to second end 156. In the exemplary embodiment, first bracket 150 is coupled (e.g., bolted) to first front member 144 of body frame 104, and is coupled (e.g., bolted) to beam 148 closer to first end 154 than to second end 156. Likewise, second bracket 152 is coupled (e.g., bolted) to second front member 146 of body frame 104, and is coupled (e.g., bolted) to beam 148 closer to second end 156 than to first end 154. As such, bumper beam 148 extends across body frame 104 in widthwise dimension 300 such that first end 154 overlaps first distal end 132 of subframe 102 in widthwise dimension 300, and such that second end 156 overlaps second distal end 134 of subframe 102 in widthwise dimension 300. Although beam 148 is arcuately-shaped in the exemplary embodiment, beam 148 may have any suitable shape in other embodiments (e.g., beam 148 may be substantially linear in some embodiments). In other embodiments, bumper frame 106 may include any other suitable number of components (e.g., beam(s) and/or bracket(s)) arranged in any suitable manner that facilitates enabling frame 100 to function as described herein. For example, bumper frame 106 may include a beam that is not a single-piece, unitary structure in some embodiments, and/or bumper frame 106 may include only one bracket in some embodiments.

In the exemplary embodiment, first brace 108 is coupled to first joint 128 of subframe 102 at a first aperture 160 of first joint 128 such that first brace 108 and/or first joint 128 are positionable in front of first wheel and tire assembly 122 in widthwise dimension 300. Moreover, first brace 108 is also coupled to beam 148 of bumper frame 106 adjacent to first end 154, such that first brace 108 is between first bracket 150 and first end 154 in widthwise dimension 300. Similarly, second brace 110 is coupled to second joint 130 of subframe 102 at a second aperture 162 of second joint 130 such that second brace 110 and/or second joint 130 are positionable in front of second wheel and tire assembly 126 in widthwise dimension 300. Moreover, second brace 110 is also coupled to beam 148 of bumper frame 106 adjacent to second end 156, such that second brace 110 is between second bracket 152 and second end 156 in widthwise dimension 300. Although first brace 108 is described in more detail below, it is noted that second brace 110 is constructed similarly to first brace 108 (i.e., first brace 108 and second brace 110 have the same design and are different only in their respective locations of coupling to subframe 102 and beam 148). As such, second brace 110 is coupled to second joint 130 of subframe 102, and to beam 148 adjacent to second end 156, in the same manner as described below with respect to first brace 108 being coupled to first joint 128 of subframe 102, and to beam 148 adjacent to first end 154.

Figure 3:
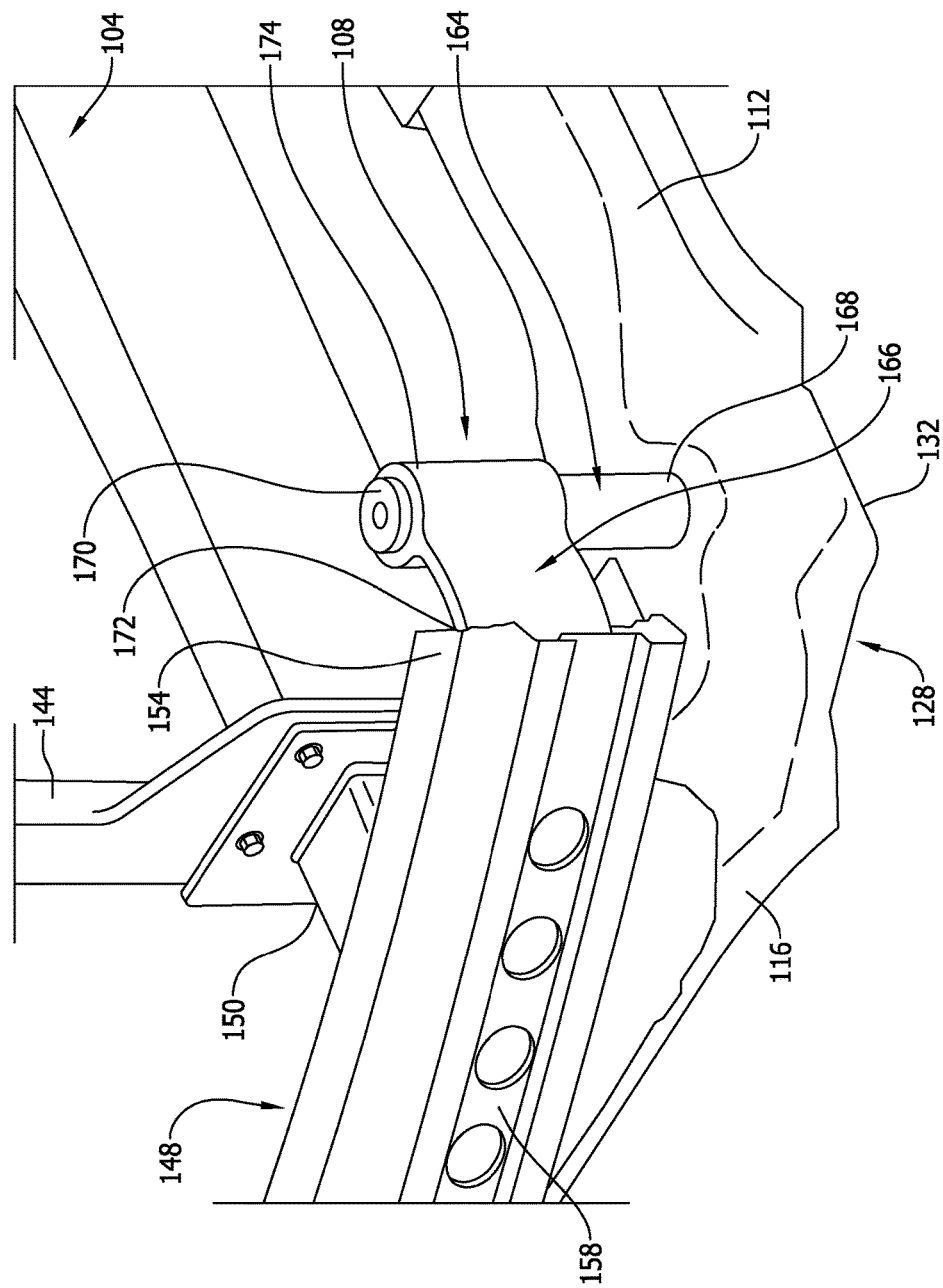
FIG. 3 is a side perspective view of an exemplary brace for use in the frame shown in FIG. 1.

FIG. 3 is a side perspective view of first brace 108. In the exemplary embodiment, first brace 108 includes a first member 164 (e.g., a post) and a second member 166 (e.g., a plate). First member 164 and second member 166 are formed (e.g., extruded) separately, and from a suitable metal (e.g., aluminum). In other embodiments, members 164 and 166 may be fabricated from any suitable material in any suitable manner. In the exemplary embodiment, first member 164 has a first end 168 and a second end 170, and second member 166 has a first end 172 and a second end 174 (e.g., a sleeve). First end 168 of first member 164 is coupled (e.g., threaded and/or bolted) to subframe 102 at first aperture 160 such that first member 164 projects from subframe 102 to second end 170. Likewise, first end 172 of second member 166 is coupled (e.g., bolted) to bumper beam 148 such that second member 166 extends from bumper beam 148 to second end 174. As such, first member 164 and second member 166 are substantially perpendicular to one another and are coupled together (e.g., metal inert gas (MIG) welded together) at second ends 170 and 174, respectively (e.g., the sleeve receives at least part of the post). In other embodiments, first member 164 and second member 166 may have any suitable shape, size, and orientation relative to one another, and may be coupled together in any suitable manner. Alternatively, first member 164 and second member 166 may be integrally formed together as single-piece, unitary structure.

Accordingly, bumper beam 148 is, on the one hand, indirectly coupled to subframe 102 via brackets 150 and 152 and body frame 104. On the other hand, however, bumper beam 148 is directly coupled to subframe 102 via braces 108 and 110. As used herein, the term "directly coupled" or any variation thereof refers to a coupling of bumper beam 148 to subframe 102 that establishes a load path from bumper beam 148 to subframe 102 such that the load path does not pass through body frame 104. Conversely, the term "indirectly coupled" or any variation thereof refers to a coupling of bumper beam 148 to subframe 102 that establishes a load path from bumper beam 148 to subframe 102 such that the load path passes through body frame 104.

In the exemplary embodiment, braces 108 and 110 facilitate transferring loads (e.g., collision loads) from bumper beam 148 directly to subframe 102, and likewise facilitate transferring loads (e.g., collision loads) from subframe 102 directly to bumper beam 148. More specifically, first brace 108 establishes a first load path from first end 154 of bumper beam 148 to subframe 102, wherein the first load path does not pass through body frame 104. Similarly, second brace 110 establishes a second load path from second end 156 of bumper beam 148 to subframe 102, wherein the second load path does not pass through body frame 104. Thus, braces 108 and 110 facilitate transferring loads from bumper beam 148 to subframe 102, and vice versa, in a manner that isolates body frame 104 from such loads, thereby maintaining the structural integrity of body frame 104 (e.g., of engine compartment 138 and cabin 142) in the event of a collision.

Figure 4:
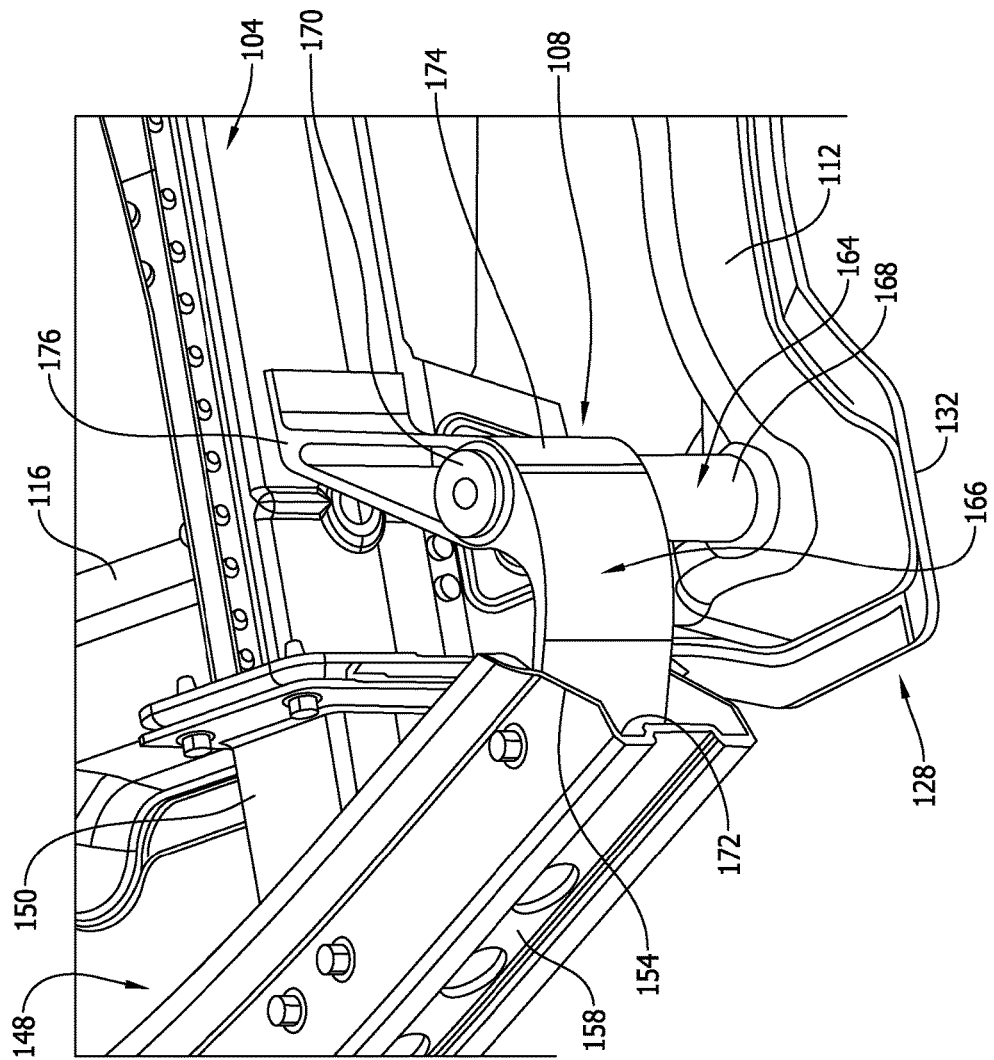
FIG. 4 is a side perspective view of another brace for use in the frame shown in FIG. 1.

More specifically, bumper beam 148 and subframe 102 are directly coupled such that bumper beam 148 and subframe 102 work in tandem to withstand (or dissipate) collision loads and prevent (or at least reduce the amount of) such collision loads from being transferred to body frame 104. For example, in one embodiment, bumper beam 148 may be designed to withstand "X" pounds of force before deforming, and subframe 102 may be designed to withstand "Y" pounds of force before deforming. If a load (e.g., a collision load) having a magnitude of "Z" pounds of force is imparted to bumper beam 148, then bumper beam 148 can itself withstand the load if Z is less than X, or bumper beam 148 can transfer the load difference to subframe 102 via first brace 108 and/or second brace 110 if Z is greater than X, such that a fraction of the load is transferred to body frame 104 only if Z is greater than X+Y. Similarly, in another example, if a load (e.g., a collision load) having a magnitude of "Z" pounds of force is imparted to subframe 102, then subframe 102 can itself withstand the load if Z is less than Y, or subframe 102 can transfer the load difference to bumper beam 148 via first brace 108 and/or second brace 110 if Z is greater than Y, such that a fraction of the load is transferred to body frame 104 only if Z is greater than Y+X. As shown in FIG. 4, some embodiments of first brace 108 may further include a third member 176 (e.g., an arm) that extends from first member 164 and/or second member 166 towards body frame 104, and third member 176 may optionally be coupled to body frame 104 in any suitable manner. Thus, the embodiments set forth above provide for a collision load management system that can manage a load case that may or may not be laterally offset from body frame 104, and may or may not be offset vertically from either bumper beam 148 or subframe 102, which can happen as a result of subframe 102 being positioned below bumper beam 148 in many vehicle frame assemblies.

The systems and methods described above facilitate providing an enhanced vehicle frame. The vehicle frame includes a body frame, a subframe mounted to the body frame, a bumper frame mounted to the body frame, and a brace that directly couples the bumper frame to the subframe. The vehicle frame therefore facilitates managing collision loads in a manner that enables loading to be managed amongst both the subframe and the bumper frame in the event of a collision in which only one of the structures is directly engaged. More specifically, the vehicle frame facilitates establishing a load path from the bumper frame directly to the subframe, or vice versa, such that the bumper frame and the subframe work in tandem to withstand collision loads. As such, in the exemplary embodiment, the direct coupling between the bumper frame and the subframe can enhance the energy management capability of the vehicle frame. This includes the subframe and bumper frame: 1) resisting deformation to withstand loading; 2) absorbing energy; and 3) transferring loading/energy to the body frame in the event of a collision. The collision may or may not directly engage the body frame. Thus, the strength of the vehicle frame is enhanced, which in turn enhances the overall level of safety associated with the vehicle frame.

Exemplary embodiments of vehicle frame systems and methods of their assembly are described above in detail. The systems and methods are not limited to the specific embodiments described herein, but rather, components of the systems and/or steps of the methods may be utilized independently and separately from other components and/or steps described herein. Each method step and each component may also be used in combination with other method steps and/or components. Although specific features of various embodiments may be shown in some drawings and not in others, this is for convenience only. Any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A vehicle frame comprising:
    a body frame;
    a subframe mounted to said body frame;
    a bumper frame coupled to said body frame, said bumper frame comprises a beam having a first end and a second end; and
    at least one brace coupling said beam to said subframe adjacent to at least one of said beam ends, wherein said at least one brace comprises a first member and a second member coupled to said first member, and wherein said at least one brace at least one of:
        extends from at least one of said subframe and said bumper frame towards said body frame; and
        is coupled to said body frame.

2. The vehicle frame of claim 1 wherein said at least one brace comprises:
    a first brace coupling said beam to said subframe adjacent to said beam first end; and
    a second brace coupling said beam to said subframe adjacent to said beam second end.

3. The vehicle frame of claim 1 wherein said vehicle frame has a widthwise dimension, said at least one brace coupled to said subframe outward of said body frame in the widthwise dimension.

4. The vehicle frame of claim 3 wherein said vehicle frame is for a vehicle having a first front wheel and tire assembly and a second front wheel and tire assembly, said subframe comprises:
   a front beam;
   a first side beam joined with said front beam at a first joint, said first side beam defining a first space sized to receive at least a portion of the first front wheel and tire assembly, wherein said first brace is coupled to said subframe at said first joint such that at least one of said first joint and said first brace is positionable in front of the first front wheel and tire assembly in the widthwise dimension of said vehicle frame; and
   a second side beam joined with said front beam at a second joint, said second side beam defining a second space sized to receive at least a portion of the second front wheel and tire assembly, wherein said second brace is coupled to said subframe at said second joint such that at least one of said second joint and said second brace is positionable in front of the second front wheel and tire assembly in the widthwise dimension of said vehicle frame.

5. The vehicle frame of claim 1 wherein said first member comprises a post and said second member comprises a plate and a sleeve such that said post is inserted at least partially into said sleeve.

6. A method of assembling a vehicle frame, said method comprising:
   mounting a subframe to a body frame;
   coupling a bumper frame to the body frame, the bumper frame includes a beam having a first end and a second end;
   coupling the beam to the subframe adjacent to at least one of the beam ends via at least one brace, wherein coupling the beam to the subframe comprises coupling a first member to a second member to form said at least one brace; and
   mounting the at least one brace such that the at least one brace at least one of:
      extends from at least one of the subframe and the bumper frame towards the body frame; and
      is coupled to the body frame.

7. The method of claim 6 wherein coupling the beam to the subframe comprises:
   coupling the beam to the subframe adjacent to the beam first end via a first brace; and
   coupling the beam to the subframe adjacent to the beam second end via a second brace.

8. The method of claim 6 wherein coupling the beam to the subframe comprises coupling the at least one brace to the subframe outward of the body frame in a widthwise dimension of the vehicle frame.

9. The method of claim 8 wherein coupling the beam to the subframe comprises:
   coupling a first brace to the subframe at a first joint of the subframe such that at least one of the first joint and the first brace is positionable in front of a first wheel and tire assembly in the widthwise dimension of the vehicle frame; and
   coupling a second brace to the subframe at a second joint of the subframe such that at least one of the second joint and the second brace is positionable in front of a second wheel and tire assembly in the widthwise dimension of the vehicle frame.

10. The method of claim 6 further comprising inserting a post at least partially into a sleeve to couple the first member to the second member.

11. A subframe for a vehicle having a first front wheel and tire assembly and a second front wheel and tire assembly, said subframe having a widthwise dimension and comprising:
   a front beam;
   a first side beam joined with said front beam at a first joint, said first side beam defining a first space sized to receive at least a portion of the first front wheel and tire assembly, wherein said first joint is sized to extend in front of the first front wheel and tire assembly in the widthwise dimension of said subframe; and
   a second side beam joined with said front beam at a second joint, said second side beam defining a second space sized to receive at least a portion of the second front wheel and tire assembly, wherein said second joint is sized to extend in front of the second front wheel and tire assembly in the widthwise dimension of said subframe;
   wherein at least one of said first joint and said second joint comprises a brace coupling structure positionable in front of the associated front wheel and tire assembly in the widthwise dimension of the subframe.

12. The subframe of claim 11 wherein said brace coupling structure comprises an aperture.

13. The subframe of claim 11 wherein each of said side beams is arcuately shaped such that its associated space is a concavity defined by its arcuate shape.

14. The subframe of claim 11 wherein said subframe comprises a rear beam extending between said first side beam and said second side beam such that said rear beam is spaced apart from said front beam.

15. The subframe of claim 11 wherein said subframe is a single-piece, unitary structure.

* * * * *